Aug. 9, 1932.    L. A. PARADISE ET AL    1,870,420
CORN HARVESTER
Filed July 22, 1929    2 Sheets-Sheet 1

INVENTORS
LOUIS A. PARADISE
WILBUR J. COULTAS
BY Brown, Jackson, Boettcher & Drenner.
ATTORNEYS WITNESS
Walter Ackerman

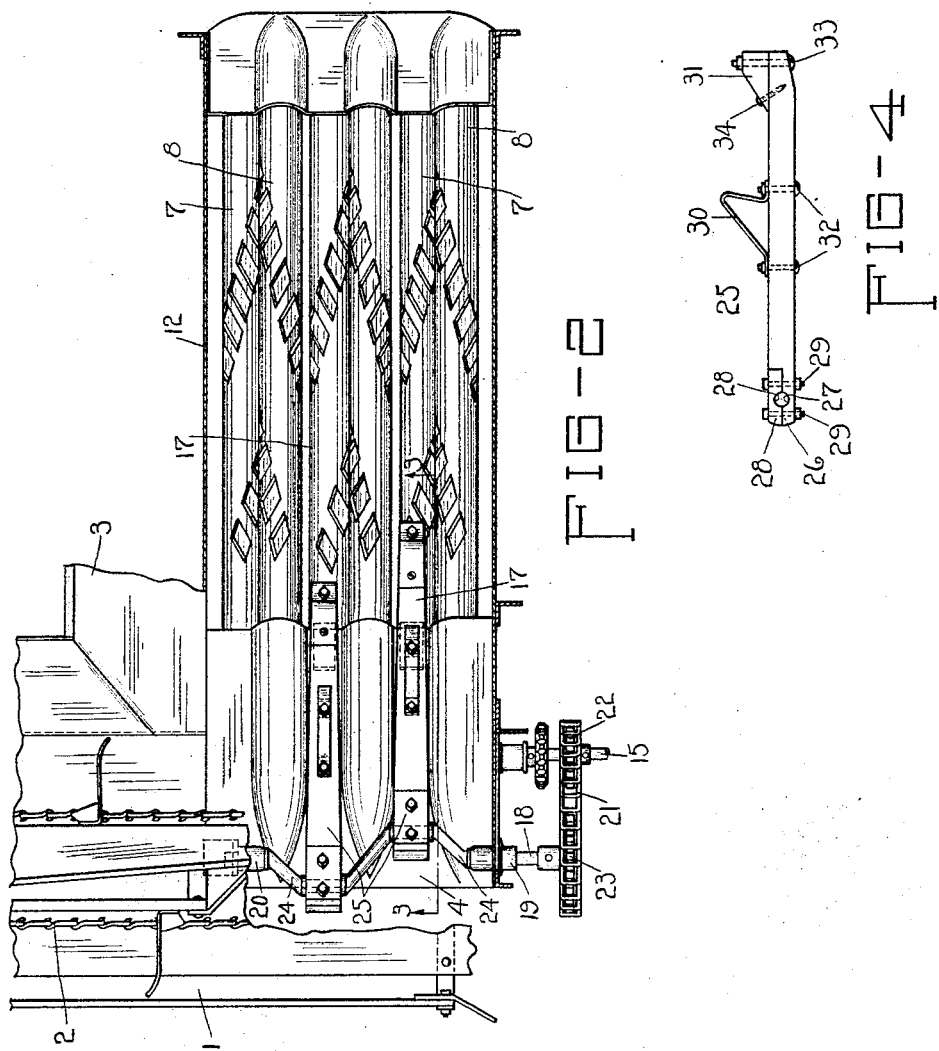

Patented Aug. 9, 1932

1,870,420

UNITED STATES PATENT OFFICE

LOUIS A. PARADISE AND WILBUR J. COULTAS, OF MOLINE, ILLINOIS, ASSIGNORS TO DEERE & COMPANY, OF MOLINE, ILLINOIS, A CORPORATION OF ILLINOIS

CORN HARVESTER

Application filed July 22, 1929. Serial No. 380,070.

This invention relates to corn harvesters, and has to do more particularly with the means for delivering the ears from the ear hopper to the husking rolls.

In corn harvesting machines difficulty and delay in operation are frequently encountered due to clogging of the hopper and failure of proper delivery of the ears therefrom to the husking rolls. This clogging is greatly aggravated when the condition of the corn stalks, or of the ground, is such that the stalks are easily pulled up by the snapping rolls and are conveyed into the hopper. We have found that clogging of the hopper can be avoided by providing suitable means for positively feeding the ears from the hopper to the husking rolls. One of the main objects of our invention is to provide simple and efficient means for feeding the ears from the hopper to the rolls.

A further object is to provide feeding means of this character which acts by a combined throwing and pushing action to deliver the ears to the husking rolls. Another object of our invention is to provide reciprocating feeding members having associated therewith ear engaging members which act to positively feed the ears from the hopper to the rolls. It is also an object of our invention to provide means for operating the feeding members in such manner to reduce to a minimum any tendency of such members to move the ears inwardly of the hopper during the inward or rearward movement of the feeding members.

Further objects and advantages of our invention will appear from the detailed description.

In the drawings:—

Fig. 1 is a fragmentary rear view of a corn harvester having feeding means in accordance with our invention applied thereto;

Fig. 2 is a section taken substantially on line 2—2 of Fig. 1;

Fig. 3 is a section taken substantially on line 3—3 of Fig. 2;

Fig. 4 is a detail elevation of one of the feeding bars.

We have illustrated our invention as applied to a corn harvester such as that disclosed in the co-pending application of Wilbur J. Coultas and Norman F. Andrews, for corn harvester, Serial No. 395,510, filed Sept. 27, 1929.

Since our invention is applied to the ear hopper, we have illustrated only the conveyor and hopper, together with the husking rolls and associated parts, which are desirable for a complete disclosure of our invention.

The harvester comprises a conveyor trough 1 in which operates a conveyor 2, this conveyor delivering the ears from the snapping rolls into an ear hopper 3. This hopper is open at its forward end and is provided with a bottom wall 4. Wall 4 is suitably shaped to provide upwardly extending elements 5 of arcuate cross section. These elements extend from the front open end of the hopper toward the rear thereof, and are disposed over gears 6 secured upon the upper ends of certain of the husking rolls 7. Each of the rolls 7 has associated therewith a cooperating roll 8 from the upper end of which extends a stub shaft 9 upon which is secured a gear 10 which meshes with gear 6. These rolls have their upper ends rotatably mounted in a bearing structure 11 which is suitably secured transversely of roll housing 12 of suitable construction. A bevel gear 13 is secured upon the upper end of each of the stub shafts 9 and meshes with a bevel gear 14 secured upon a husking roll drive shaft 15 which is driven in a suitable manner from the power shaft of the harvester. At their lower ends, the rolls are suitably mounted in a bearing member 16 secured in housing 12 in a suitable manner.

The husking rolls operate to remove the husks from the ears delivered thereto from the hopper, in a manner well understood in the art.

The elements 5 of bottom wall 4 of the hopper define troughs 17 which converge downwardly, it being noted that wall 4 is inclined downwardly and forwardly of the hopper so as to direct the ears toward the forward open end thereof.

A crank shaft 18 is rotatably mounted transversely of hopper 3 and adjacent the rear thereof, in bearing members 19 and 20 suitably secured to the rear and front walls of housing 12. Shaft 18 is driven from shaft 15 by a sprocket chain 21 which is trained about a sprocket wheel 22 secured on shaft 15 and a sprocket wheel 23 secured on shaft 18. The latter shaft is provided with two oppositely directed cranks 24 and, as will be noted more clearly from Figs. 1 and 3, is disposed an appreciable distance above bottom plate 4 of the hopper. This crank shaft is rotated in a clockwise direction, as indicated in Fig. 1.

In order to assure positive feed of the ears from the hopper to the husking rolls, we provide two feeding bars 25 which operate in the troughs 17. These bars are preferably formed of wood and are of rectangular cross section. As will be noted more clearly from Fig. 4, each of the bars 25 is reduced in vertical thickness, at its rearward portion, to provide a bearing element 26 having a transversely extending semi-cylindrical recess 27. A cap member 28, provided in its under face with a recess 28' similar to recess 27, is suitably secured upon the upper face of element 26, as by means of bolts 29. This provides simple and efficient means for loosely attaching the bars, at their rearward ends, to the pins of the respective cranks so as to be reciprocated thereby during rotation of shaft 18.

Each of the bars 25 is provided, on its upper face, with two ear engaging members 30 and 31 disposed at the central portion of the bar and the forward end thereof, respectively. Member 30 is of approximately inverted V-shape and is conveniently formed from a suitable length of strap steel bent into desired shape. This member is suitably secured to the bar, as by means of bolts 32. Member 31 is preferably formed from a block of wood and is suitably secured to the bar as by means of a bolt 33 and a screw 34. It is to be particularly noted that the rearward faces of the members 30 and 31 are inclined downwardly and rearwardly toward the bar and the forward faces of these members are substantially perpendicular to the bar.

In the operation of the machine, the bars 25 are reciprocated in the troughs 17, one of the bars moving forwardly toward the open end of its trough while the other bar moves rearwardly of its trough, due to the opposite relation of the cranks 24.

By rotating shaft 18 in the direction indicated, as each bar is moved rearwardly the rearward end of such bar is lowered so as to be moved away from the superposed ears of corn, thus reducing to a minimum any tendency which this bar might have to pull the ears toward the rear of the hopper. As the bar passes from its rearmost position and starts to move forwardly, the rearward end thereof is raised so that, during the greater portion of its forward travel, the bar is disposed at a decided forward and downward inclination relative to the bottom wall of the hopper, thus greatly facilitating feed of the ears by this bar from the hopper to the husking rolls. This operation of the bars will be readily understood from Fig. 1, in which the positions of the bars are shown in dotted lines, the lower bar being approximately midway of its rearward travel and the upper bar being approximately midway of its forward travel. During the forward travel of the bar the outer faces of the members 30 and 31 engage the ears of corn and serve to positively feed such ears to the husking rolls which, as will be noted from Figs. 1 and 3, are disposed adjacent and below the forward open end of the hopper. During rearward travel of the bar, the inclined rearward faces of members 30 and 31 serve to deflect the superposed ears upwardly away from such members, thus reducing any tendency of these members to drag the ears inwardly of the hopper rearwardly thereof to a minimum. The feeding bars also act, during forward movement thereof, to throw the ears forwardly toward the front of the hopper. This facilitates feeding of the ears to the husking rolls.

The bars 25, during reciprocation thereof, are confined laterally and guided by the elements 5 which define the troughs 17 in which these bars operate. The forward ends of the bars are freely movable over bottom plate 4 of the hopper, forwardly and rearwardly thereof. Preferably, in order to prevent objectionable wear of plate 4, I provide suitable wear plates 35 which are secured to the upper face of plate 4 at the forward portion thereof, and are disposed in the troughs 17. These wear plates support the forward ends of the bars 25 and are of proper length to accommodate the full forward and rearward movement thereof.

While we preferably provide the bars 25 with the ear engaging members 30 and 31, these members are not essential and, if desired, may be omitted. Ordinarily, however, we prefer to use the ear engaging members as assuring a more positive feed. As will be understood by those skilled in the art, changes in construction and arrangement of parts of our invention may be resorted to without departing from the field and scope of the same, and we intend to include all such variations, as fall within the scope of the appended claims, in this application in which the preferred form only of our invention is disclosed.

What we claim is:—

1. In combination in a corn harvester, an ear receiving hopper open at one end and comprising a bottom wall having elements defining troughs extending forwardly and rearwardly of the hopper, husking rolls at the forward end of the hopper, feeding bars mounted for reciprocation in said troughs forwardly and rearwardly of the hopper, and means for reciprocating said bars.

2. In combination in a corn harvester, an ear receiving hopper open at one end and comprising a bottom wall having elements defining downwardly converging troughs extending forwardly and rearwardly of the hopper, husking rolls at the forward end of the hopper, feeding bars mounted for reciprocation in said troughs forwardly and rearwardly of the hopper, and means for reciprocating said bars.

3. In a corn harvester, in combination, an ear receiving hopper open at its forward end and having a bottom wall, a crank shaft rotatably mounted adjacent the rear of the hopper transversely thereof and an appreciable distance above said wall, said shaft having two oppositely related cranks, two feeding bars having their forward ends freely movable over the bottom wall of the hopper and their rearward ends loosely connected to the respective cranks of the shaft, means for rotating said shaft, and members carried by the bottom wall of the hopper and defining troughs receiving and guiding the bars, said troughs acting to direct the ears to said bars.

4. In combination in a corn harvester, an ear receiving hopper, means for delivering ears thereto, means forming a bottom for the hopper including a plurality of husking rolls at the forward end and a bottom wall overlying the rear ends of said rolls and provided with troughs, means below said wall for driving the rolls, ear feeding mechanism slidable in the troughs and operative to direct ears to the rolls, and driving means for the ear feeding mechanism operated by the driving means for the rolls.

5. In combination in a corn harvester, an ear receiving hopper, means for delivering ears thereto, means forming a bottom for the hopper including a plurality of husking rolls at the forward end and a bottom wall overlying the rear ends of said rolls and provided with troughs, means for driving the rolls, ear feeding mechanism including bars slidable in the troughs and operative to direct ears to the rolls, and driving means for the ear feeding mechanism operated by the driving means for the rolls.

In witness whereof, we hereunto subscribe our names this 17th day of July, 1929.

LOUIS A. PARADISE.
WILBUR J. COULTAS.